March 22, 1960
J. F. HUTTO
2,929,857
METHOD AND APPARATUS FOR MEASURING AND CONTROLLING FLUID FLOW
Filed Jan. 9, 1958
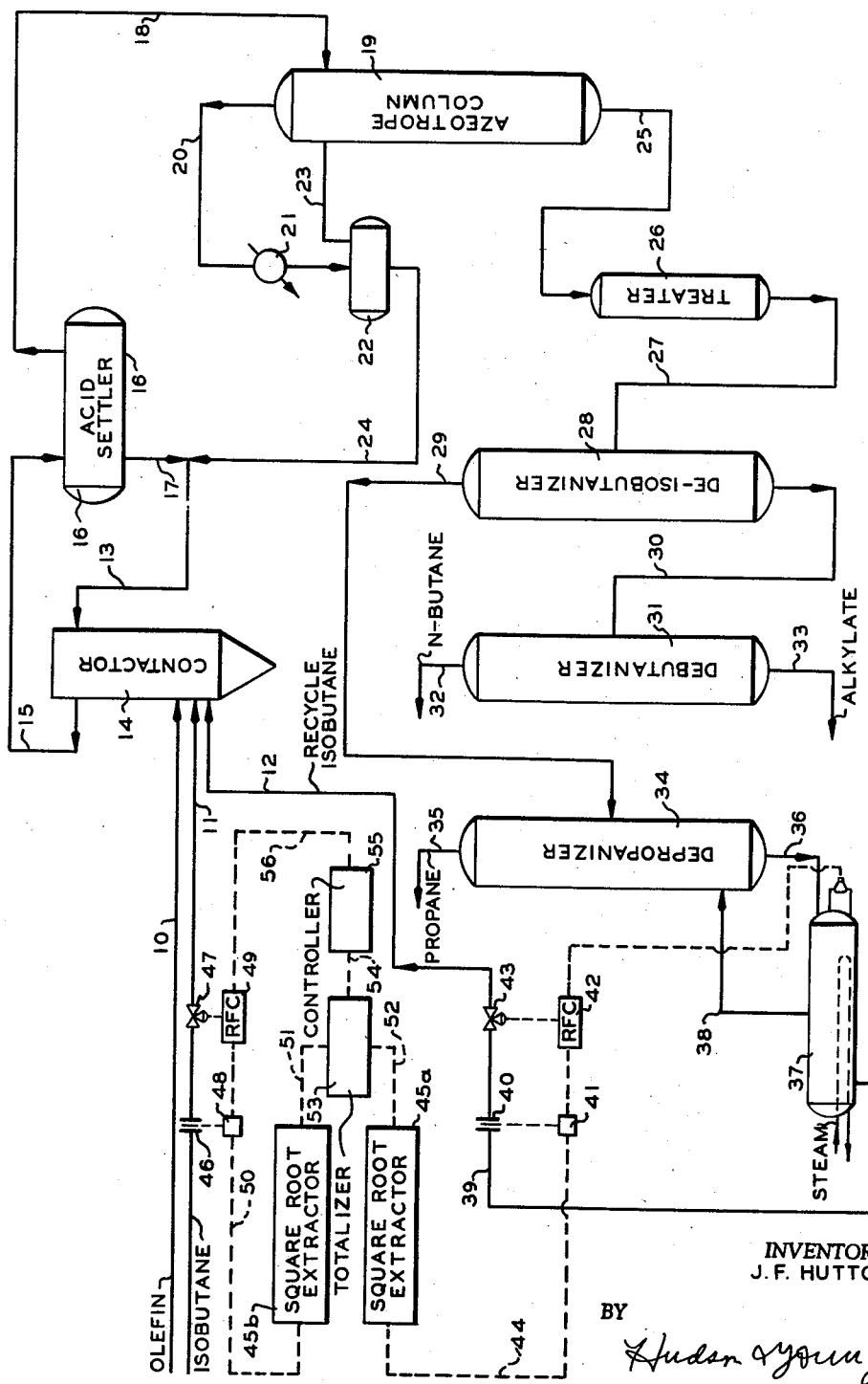
INVENTOR.
J. F. HUTTO
BY
Hudson & Young
ATTORNEYS 2,929,857
Patented Mar. 22, 1960

2,929,857
METHOD AND APPARATUS FOR MEASURING AND CONTROLLING FLUID FLOW

John F. Hutto, Bartlesville, Okla., assignor to Phillips Petroleum Company, a corporation of Delaware Application January 9, 1958, Serial No. 707,997

13 Claims. (Cl. 260—683.48)

This invention relates to method and apparatus for measuring and controlling fluid flow in fluid distribution systems. In accordance with one aspect, this invention relates to an improved method and/or apparatus arrangement for measuring and controlling fluid flow in a fluid distribution system wherein it is desired to maintain a constant predetermined total fluid flow rate. In accordance with another aspect, this invention relates to an improved method and/or arrangement of apparatus for measuring and controlling the flow of reactants in a chemical reaction process wherein it is desired to maintain a constant predetermined total flow of reactants passed to a place of utilization in said process. In accordance with another aspect, this invention relates to an improved method and/or arrangement of apparatus for measuring and controlling the flow of reactants in an alkylation process wherein the flow rate of one of the reactants is controlled to obtain a predetermined constant ratio of one reactant to the total of the remaining reactants introduced into the reaction zone of said process.

In many fluid distribution systems comprising a plurality of fluid flow streams that are introduced separately, for example, into a place or zone of utilization, it is often desirable, if not essential, in some installations to maintain a predetermined constant total flow rate of the flow streams utilized in order to obtain a desired result. This is especially true, for example, in various chemical reaction processes wherein a plurality of reactants are introduced separately into the reaction zone of the process and wherein both fresh and recycled unreacted reactants are employed, and wherein it is desired to maintain the total flow of fresh and recycled reactant at some predetermined rate. One such process is the alkylation reaction wherein olefin and isoparaffin comprising both fresh and recycled unreacted isoparaffin are employed as reactants, and wherein it is desired to maintain a constant total flow of fresh and recycled isoparaffin introduced into the reactor. Also in the alkylation process it is often desirable to maintain a fixed ratio of olefin to total isoparaffin reactant, which may be made up of both fresh and recycled unreacted isoparaffin passed to the reaction zone. Various methods and/or apparatus have either been utilized or suggested in the past for measuring fluid flows and controlling same to produce a constant total flow; however, unfortunately many of these arrangements, for one reason or another, either have been to complicated for commercial utilization or they have been inaccurate and unreliable and consequently were not commercially feasible.

Accordingly, an object of the present invention is to provide a relatively simple, reliable and efficient combination of instruments for measuring various flows in a fluid distribution system and controlling same to produce a total constant fluid flow. Another object of this invention is to provide an improved method and/or arrangement of instruments for maintaining a constant total flow of reactants in chemical reaction processes having separate introduction of said reactants into the place of utilization. Another object of this invention is to provide a relatively simple and reliable combination of instruments for measuring and controlling the flow of reactants in an alkylation reaction process whereby a more economical and efficient operation of said process is obtained. Other aspects, objects, as well as the several advantages of this invention are apparent from the study of the disclosure, the drawing, and the appended claims.

In accordance with a broad concept of the present invention, I provide an improved method of measuring and controlling the fluid flow in a fluid distribution system having a plurality of fluid flow streams, and wherein it is desired to maintain a constant total flow rate of said streams, comprising the steps of measuring the flow of each flow stream to obtain signals that are proportional to the square of flow rate of each stream, passing said signals to square root extraction zones to obtain signals that are linear and directly proportional to the flow rate of each stream, totalizing said linear signals to obtain a resultant linear signal that is directly proportional to the total flow rate of said streams, passing said resultant linear signal to a flow controlling and recording zone and in response to changes in said resultant linear signal, adjusting the flow rate of one of said fluid streams to maintain said predetermined total flow rate.

In accordance with a more specific concept of the present invention, I provide an improved method of measuring and controlling the operation of a chemical process such as, for example, the alkylation of olefins and isoparaffins wherein a plurality of reactants, which may comprise fresh and unreacted recycled reactant, are separately introduced into a place of utilization, such as the reaction zone, and wherein it is desired to maintain a predetermined constant total reactant flow rate, comprising the steps of measuring the flow rate of each of said reactant streams to obtain a signal proportional to the square of the flow rate of each stream, passing said signals to square root extraction zones to obtain linear signals that are directly proportional to the rate of flow of the individual streams, passing said linear signals to a totalizing zone to obtain an additive signal that is directly proportional to the total flow rate of said fluid reactant streams, passing said additive signal to a controlling and recording zone and employing said additive signal in said controlling zone to adjust the flow rate of one of said streams in response to changes in said additive signal so as to maintain said predetermined total rate.

In accordance with another concept of the present invention, I provide an improved arrangement of apparatus for measuring and controlling fluid flow in a fluid distribution system comprising in combination; conduit means for conveying said fluids; flow restriction means in said conduits; flow measuring and differential pressure transmitting means connected to said conduits to obtain signals proportional to the square of flow rate in each of said conduits; mathematical calculating means comprising square root extraction means and totalizing means connected to obtain said signals and to convert said signals into a resultant linear signal that is directly proportional to the total flow rate in said conduits; control means connected to obtain said resultant linear signal; control valve means in one of said conduits connected to obtain impulses that are obtained from said control means responsive to changes in said resultant linear signal, thereby maintaining a predetermined constant total flow rate of fluids in said system.

The various individual pieces of control equipment employed herein are of conventional well-known function and design. Consequently, only brief reference is made here to their description. Back pressure or flow control valves employed herein may be of any well-known diaphragm type, such as pilot operated valves, pressure balance valves, or spring loaded valves. In any case, a change in the pressure which is being controlled produces an effect on the diaphragm valve so as to cause it to either open or close. A back pressure control valve can be set to maintain any predetermined pressure. Consequently, a back pressure control valve set to maintain a given pressure tends to move to a more nearly open position at any pressure higher than the set pressure, is more nearly closed at any pressure lower than the set pressure, and "throttles" when operating to maintain a pressure within a narrow range of the set pressure. The fluid flow responsive means employed is preferably an orifice meter, which may be connected to a control means, preferably a rate of flow control instrument. By flow responsive means, it is meant any element or device which partially restricts the flow and thus establishes a pressure differential, in a portion of the line, which is proportional to the square of the rate of flow. Thus, an orifice plate, Venturi, etc., may be used in the practice of this invention. Likewise, the control means may include any instrument or device which is actuated by the flow responsive means to produce a control effect or signal which may take the form of a change in pressure or rate of flow of a fluid such as air, or hydraulic fluid, usually called the controlled fluid, or of an electric circuit which is energized or de-energized.

The control valve means or motor valve means referred to herein are preferably of the conventional diaphragm type and are controlled by liquid flow responsive means in combination with control instrument means, square root extraction means, totalizing means and a second controlling-recording means, so that when the flow rate of the controlled flow stream as determined by the flow responsive means in said controlled stream decreases, for example, to below the predetermined minimum rate, a control effect or signal will be produced by the flow responsive means which will reset the control instrument which in turn will open or close the motor valve means as the case may be. For example, when the rate of flow of the controlled fluid stream decreases to below the predetermined minimum, the signals produced by the flow responsive means in the controlled stream and in the other measured streams are passed to square root extraction means wherein signals directly proportional to the flow rate of each stream are obtained, and these signals are then passed to a signal totalizing means wherein a single linear signal is obtained that is directly proportional to the total flow rate of the measured streams, and then this signal is passed to a second controlling-recording means, and in response to changes in this signal a "baffle" or "flapper" in the controlling means actuated by said signal will be brought into a more nearly closed position relative to an air nozzle, e.g., which produces an increase in the controlled air pressure from the second control instrument to the rate of flow controller, thereby resetting the rate of flow controller, which in turn adjusts the controlled air pressure communicating with the diaphragm of the motor valve. Such a control effect increases the pressure on the diaphragm and causes the motor valve to open or close depending upon the particular control combination employed.

In order to further describe the apparatus and method of this invention reference is made to the attached drawing. The drawing diagrammatically represents an arrangement of apparatus suitable for the practice of this invention. In order that this invention may be more clearly understood a brief description of an alkylation process will be made. It is to be understood that the flow diagram is diagrammatic only and may be altered in many respects by those skilled in the art and yet remain within the scope of my invention.

Referring now to the drawing, isobutane fed by way of conduit 11 and conduit 12, olefin comprising essentially butylene and propylene fed by way of conduit 10 and hydrofluoric acid catalyst by way of conduit 13 are commingled in alkylator or contactor 14, under alkylation conditions, thus obtaining an alkylation effluent containing the desired alkylate product. The conditions of temperature, pressure and time, as well as the ratios of isobutane to olefin and of hydrocarbon to acid are well known in the art. Said conditions do not form a part of the present invention and can be supplied by one skilled in the art. The resulting effluent mixture from alkylator 14 is passed by way of conduit 15 to a settler 16 in which it is separated into an acid phase and a hydrocarbon phase. Separated acid is recycled by way of conduit 17 to conduit 13 and then to alkylator 14, as described. The hydrocarbon phase from acid settler 16 is passed by way of conduit 18 into azeotrope column 19. The overhead product removed from column 19 by conduit 20 comprising light hydrocarbons and HF acid is condensed by cooler 21 and introduced into accumulator 22 wherein the condensed materials are allowed to separate into an acid-rich and hydrocarbon-rich phase.

The hydrocarbon-rich phase separated in accumulator 22 is refluxed and introduced into column 19 by conduit 23, and the acid-rich phase is removed from accumulator 22 and passed by way of conduit 24 and recycled to contactor 14 by way of conduit 13. A hydrocarbon kettle product is removed from column 19 by way of conduit 25 and is passed through treater 26, such as a bauxite treater, to remove any traces of free hydrogen fluoride remaining in the hydrocarbon phase, and subsequently passed by conduit 27 and introduced into deisobutanizer column 28. From the bottom of deisobutanizer 28 there is withdrawn through conduit 30 a deisobutanized alkylate which is passed to debutanizer column 31, from which there is taken overhead normal butane through conduit 32 and from the bottom of column 31 there is withdrawn through conduit 33 a debutanized alkylate product. This alkylate product can be passed, if desired, to a rerun treating zone and treated under conditions well known to those skilled in the art.

A hydrocarbon fraction comprising isobutane, propane, and gases lighter than propane is removed overhead from deisobutanizer 28 through conduit 29 and introduced into depropanizer 34, wherein propane and lighter gases are removed overhead through conduit 35. Isobutane is removed as kettle product from column 34 through conduit 36 and introduced into reboiler 37 wherein it is heated and part of the isobutane is recycled back to column 34 through conduit 38 and the remainder of the isobutane is removed from reboiler 37 by way of conduit 39 and recycled through conduit 12 and introduced into contactor 14, as previously described.

In accordance with the present invention, a fluid flow responsive means 40, usually an orifice plate is located in line 39 to detect the rate of flow of recycled isobutane. Also, a fluid flow responsive means 46 similar to 40 is located in conduit 11 to detect the rate of flow of fresh isobutane introduced into contactor 14. Control means 42 and 49, usually rate of flow controllers, communicate with flow responsive means 40 and 46 and are located preferably near thereto. RFC-42 and 49 may have manual as well as an automatic set point. The flow orifices 40 and 46 installed in the two isobutane streams produce signals, preferably pneumatic signals, proportional to the square of flow rate of each of these streams by means of, for example, Foxboro d/p cells 41 and 48. In the present embodiment, rate of flow controller 42 which controls the degree of opening of motor control valve 43 located in recycle isobutane line 39 is reset by a liquid level controller located on reboiler 37. Thus, a predetermined rate of flow of isobutane is recycled to contactor 14 through line 39, flow responsive means 40, motor control valve means 43, and line 12. The pressure differential signal produced across flow orifice 40 is proportional to the square of the flow rate of recycled isobutane passed through conduit 39 and introduced into contactor 14. Similarly, flow responsive means 46 produces a pressure differential measured across orifice plate 46 that is proportional to the square of the flow rate of fresh isobutane introduced into contactor 14 by way of conduit 11. Thus, these two signals, which are preferably pneumatic signals, are picked up by d/p cells 41 and 48 and are transmitted or passed by way of lines 44 and 50 into square root extractor means 45a and b.

Square root extractor means 45a and b can be any suitable square root extraction instrument known in the art; however, I prefer to use the Storeberg force bridge such as disclosed in U.S. Patent 2,643,055, and also described in Minneapolis-Honeywell manual, which can be conveniently used to convert a pneumatic signal transmitted from a pressure differential flow transmitter into a linear output pneumatic signal that is directly proportional to the flow rate of the measured fluid flow stream. Thus, by taking the square root of the signal the linear signal obtained by extractor 45a is directly proportional to the flow rate of recycle isobutane in conduit 39 and is removed from square root extraction zone 45a through conduit 52 and introduced into totalizer 53. Likewise, the linear pneumatic signal obtained that is directly proportional to the flow of fresh isobutane introduced through conduit 11 is passed from square root extraction zone 45b into totalizer 53 by way of conduit 51.

Totalizer 53 can be any conventional instrument capable of adding linear signals, whether pneumatic or electronic in order to obtain a resultant linear signal that is directly proportional to the total fluid flow rates in conduits 11 and 39. One such instrument that can be used as the totalizer is a Foxboro model 56 computing relay which operates on a force balance principal. Other known instruments that will perform arithmetical operations such as adding, etc., and are capable of totalizing two or more linear signals to produce a single output linear signal can be employed in the practice of the present invention.

The additive or resultant linear pneumatic signal obtained in totalizer 53 is passed by way of line 54 to controller-recorder means 55, having a manual set point therein corresponding to the total flow desired, wherein the additive signal is utilized to reset rate of flow controller 49, which in turn controls the flow of fresh isobutane passed through conduit 11 by regulating motor valve 47 thereby maintaining a constant predetermined total flow of isobutane passed to contactor 14. Thus, the LLC on reboiler 37 provides the signal which resets the set point for RFC-42 and controller 55 provides the signal which resets the set point for RFC-49. RFC-42 and 49 are conventional instruments such as shown in Foxboro Instrumentation Bulletin 450, pages 52 and 55, having a pneumatic reset.

Thus, in actual operation a predetermined flow rate of isobutane is recycled through conduit 39 and regulated by motor valve 43 which in turn is held in a predetermined position by RFC-42 as determined by the set point on RFC-42, which is reset as shown in the drawing by the LLC on reboiler 37. If the liquid level in reboiler 37 drops, the isobutane flow in conduit 39 must be decreased. When the level drops in reboiler 37 the LLC resets RFC-42, which in turn pinches down motor valve 43.

A pneumatic signal proportional to the square of flow in conduit 39 is transmitted by d/p cell 41 to square root extractor 45a which in turn extracts the square root of said signal to obtain a linear directly proportional to the flow rate in conduit 39 which is passed to totalizer means 53. Likewise, the constant flow of isobutane in conduit 11 is measured by flow responsive means 46 and a signal picked up by d/p cell 48, which transmits a pneumatic signal also proportional to the square of flow in conduit 11, and the square root of said signal is extracted unit 45b, and the resulting linear signal is passed to totalizer 53. The total linear signal now obtained by totalizer 53, which is directly proportional to the total fluid flow in conduits 11 and 39, is less than the preset total flow of isobutane desired. Thus, in response to this change, controller 55 passes a pneumatic signal to RFC-49 which resets this instrument, which in turn opens motor valve 47 so as to increase the flow of fresh isobutane in conduit 11. This increase in flow rate is then picked up by flow responsive means 46 and this signal passed as previously described to totalizer 53 and controller 55 to maintain the preset total flow rate. Similarly, if the level in reboiler 37 rises, motor valve 43 is opened to increase the flow of recycle isobutane and the flow in conduit 11 is reduced to maintain the desired predetermined total flow passed to contactor 14. While I have indicated in the above description of my invention that I prefer to use a combination of pneumatic instruments it should be realized that substantially the same results can be obtained by the use of electronic instruments, for example, or a combination of pneumatic and electronic instruments can be used, if desired. Pneumatic signals can be conveniently converted into electronic signals and vice versa by employing pneumatic-electronic transducers. The important concept of the present invention involves the arrangement of the particular instruments disclosed in such a way that the total flow rate of several fluid flow streams which are unmixed can be maintained at some predetermined constant total flow.

While the control apparatus is described along with the above described alkylation process flow diagram it should be realized that more than two fluid flow streams can be controlled by the practice of this invention. Further, the invention should not be construed as being limited specifically to HF alkylation flow control since the method and apparatus can be applied to other processes wherein a plurality of reactant streams are passed to a place of utilization and it is desired to maintain a predetermined total constant flow.

In connection with the above described alkylation process, the additive or resultant linear signal obtained in totalizer 53, which is directly proportional to the total flow measured, could be used to reset olefin feed flow by means of control valves (not shown) so as to maintain a constant olefin-isobutane ratio.

One such control arrangement can comprise, for example, a flow responsive element in each of the feed streams passed to the alkylator, that is, fresh and recycled isobutane and olefin feed streams, and a differential pressure transmitter connected to each of the flow responsive elements. A flow control valve such as a diaphragm motor valve can be located in one of the isobutane streams and in the olefin stream, and each of the flow control valves is actuated by a flow controller connected to their respective differential pressure transmitters. Connected to each of the differential pressure transmitters is a square root extraction means to obtain a linear signal proportional to the flow rate in each of the individual streams, and the two signals obtained that are proportional to the isobutane flow rates can be passed to a totalizing means to obtain a signal that is directly proportional to the total isobutane flow rate. This total linear signal in turn can be passed to the flow controller connected to one of the isobutane streams to maintain a constant total flow rate of isobutane by adjusting the flow control valve in a particular isobutane stream. Also, the linear signal obtained from the totalizing means can also be passed to a ratio controller wherein the signal obtained by the olefin square root extraction means is compared with the total flow rate of isobutane, and the resultant signal obtained from the ratio controller passed to the olefin flow controller which is employed to adjust the flow rate of olefin by regulating the flow control valve, thereby maintaining the desired ratio of olefin to isobutane. In such a system the total flow rate of fresh isobutane plus recycled isobutane is maintained constant by manipulating either one of the two streams. In addition, the ratio of fresh isobutane plus recycled isobutane to olefin is maintained constant by manipulating the olefin flow rate. Also, the flow transmitter on one of the isobutane streams could have a controller and motor valve associated with it, manipulated, for example, by a liquid level controller.

In a less preferred embodiment of the above described ratio control system, the flow controller and its associated control valve employed in the above embodiment to regulate the flow of one of the isobutane streams could be eliminated, however, in such a control arrangement a total flow rate of fresh isobutane plus recycled isobutane is not maintained constant but rather both streams will vary at will. The ratio of fresh isobutane plus recycled isobutane to olefin can be maintained constant in such a control arrangement.

The utility of the instrumentation of the present invention can also be applied to other fluid distribution systems such as, for example, a gas-fired boiler or furnace wherein it is desired to feed a predetermined amount of gas to the burners, which are supplied by natural gas from one header and producer gas from another, and assuming that the natural gas is the cheaper gas to be used, the producer gas flow to the burners could be controlled in response to the measuring and controlling system of the present invention in order to maintain a predetermined total flow to the furnace from the two headers. The present invention may also be utilized in a return collection system for a plant cooling tower, for example, wherein measurement of the flow in the final larger header might be impractical due to its large size, and by the practice of the present invention the smaller return streams could be measured which would produce a resultant signal representing the sum of the individual streams which then could be used to regulate make-up water added to the cooling tower.

My invention will be practiced primarily in connection with alkylation of isobutane with low-boiling olefins, such as butylenes and/or propylene or amylenes. The olefin feed may comprise a butane-butylene fraction or a butane-amylene or butylene-propylene fraction from a refinery. However, in many cases it will be possible to apply the features of my invention to the reaction of other low-boiling alkylatable compounds, especially the isoparaffins, particularly isopentane, and low-boiling aromatics such as benzene and toluene, phenol, and cycloparaffins such as cyclohexane, and to apply the features of the invention when other alkylating reactants are employed, such as higher-boiling olefin hydrocarbons whether those are produced by polymerization or are produced by other means, such as cracking or dehydrogenation, and also when other alkylating reactants such as alkyl halides, alcohols and similar alkyl compounds are used.

As previously pointed out, the conditions of temperature, pressure, and time, as well as the ratios of isobutane to olefin and of hydrocarbon to acid are well known in the art. However, the conditions in the alkylator can be as follows: temperature 50–150° F.; pressure sufficient to maintain liquid phase; average reaction time, of the order of about 5 to 15 minutes, and rapid agitation to maintain intimate contact between acid and hydrocarbon phases. The ratio of isobutane-to-alkylating agent or olefin will be about 6:1 to 10:1 by weight, acid-to-hydrocarbon ratio will be about 2:1 by weight. Any suitable liquid alkylation catalyst which is capable of effecting alkylation of the isobutane with the olefin under conditions herein described may be employed. Generally speaking, I employ the liquid inorganic acids such as anhydrous hydrofluoric acid and concentrated sulfuric acid.

The following is a specific example of operation according to the present invention as described above in connection with the attached drawing.

SPECIFIC EXAMPLE

In a specific example employing a control arrangement described in connection with the drawing, alkylation reactor 14 is operated at 39 p.s.i.a and 78° F. The isobutane to olefin mol ratio is maintained at 8.4:1 and the volume ratio of catalyst (94.5 weight percent HF) to hydrocarbon is 1:1. The flow rate of fresh isobutane passed to contactor 14 is controlled so as to maintain a constant total flow of isobutane, that is fresh isobutane and recycled isobutane, and thereby maintain the desired ratio of isobutane to olefin. Each barrel of olefin reacts with 1.2 barrels of isoparaffin to produce 1.7 barrels of total alkylate. The olefin, isobutane recycle, and fresh isobutane are introduced into reactor 14 at 90° F., after the streams are cooled to this temperature by indirect heat exchange with cooling water. Lower temperatures are not available due to cooling water limitations. The recycle catalyst is introduced at 78° F.

*Olefin feed (10)*

| | |
|---|---|
| Barrels per day | 5,000 |
| Composition, B/D: | |
|     Propylene | 1,635 |
|     Propane | 635 |
|     Butylene | 1,660 |
|     Isobutane | 835 |
|     n-Butane | 235 |
| Total olefin, B/D | 3,295 |
| Temperature, ° F | 90 |

*Fresh isobutane (11)*

| | |
|---|---|
| Barrels per day | 3,249 |
| Composition, B/D: | |
|     Propane | 67 |
|     Isobutane | 3,115 |
|     n-Butane | 67 |
| Total isobutane, B/D | 3,115 |
| Temperature, ° F | 90 |

*Recycle isobutane (39)*

| | |
|---|---|
| Barrels per day | 29,600 |
| Composition, B/D: | |
|     Propane | 300 |
|     Isobutane | 29,000 |
|     n-Butane | 300 |
| Total isobutane, B/D | 29,000 |
| Temperature, ° F | 90 |

*Catalyst (13)*

| | |
|---|---|
| Barrels per day | 37,850 |
| Wt. percent HF | 94.5 |
| Temperature, ° F | 78 |

*Contactor (14)*

| | |
|---|---|
| Pressure, p.s.i.a. | 39 |
| Temperature, ° F | 78 |
| iC$_4$/olefin mol ratio | 8.4:1 |
| Cat./hydrocarbon vol. ratio | 1:1 |
| Alkylate (butane-free), B/D | 5,600 |
| Line (15), B/D | 36,204 |
| Composition, B/D: | |
|     Isobutane | 29,000 |
|     Propane | 1,002 |
|     n-Butane | 602 |
|     Alkylate | 5,600 |

As will be evident to one skilled in the art, various modifications can be made or followed in light of the foregoing disclosure and discussion without departing from the spirit or scope of the disclosure or from the scope of the claims.

I claim:

1. In a fluid flow system comprising a plurality of variable fluid flow streams and wherein a predetermined constant total flow rate of said streams is to be maintained, the improvement comprising the steps of measuring the flow of said streams and obtaining signals proportional to the square of flow rate of each stream, passing said signals to square root extraction zones to obtain linear signals directly proportional to each stream flow rate, passing said linear signals to a signal totalizing zone to obtain a positive resultant variable linear signal that is directly proportional to the total of the flow rates of said streams, passing said resultant signal to a flow controlling zone and in response to changes in said resultant linear signal employing said resultant signal to adjust the flow rate of one of said variable streams to maintain said predetermined total flow rate.

2. In a fluid distribution system comprising a plurality of variable fluid flow streams that are separately passed unmixed to a place of utilization wherein a predetermined constant total flow rate of said streams is maintained, the improvement comprising measuring the flow of each stream to obtain pneumatic signals proportional to the square of each stream flow rate, passing said signals to square root extraction zones to obtain signals that are linear and directly proportional to each flow stream rate, totalizing said linear signals to obtain a positive resultant variable linear signal that is directly proportional to the total of the flow rates of said streams, passing said resultant signal to a flow controlling zone, and responsive to changes in said resultant signal adjusting the flow rate of one of said streams to maintain said predetermined total flow rate.

3. In a method of measuring the flow rate of each of a plurality of variable fluid flow streams in a fluid distribution system and controlling the flow of one of said streams to maintain a predetermined constant ratio of said one flow to the total of the remaining flows and to maintain a predetermined constant total of said remaining flows, the improvement comprising measuring the flow rate of each said remaining stream to obtain signals proportional to the square of flow of each said stream, passing said signals to square root extraction zones to obtain linear signals directly proportional to the flow of each said remaining stream, passing said linear signals to a totalizing zone to obtain a positive resultant variable linear signal that is directly proportional to the total flow rate of said remaining streams, passing said resultant linear signal to a flow controlling zone, employing said resultant signal to adjust the flow rate of one of said remaining streams so as to maintain a predetermined constant total flow rate of said remaining streams, and further employing said resultant linear signal to adjust the flow of said one stream so as to maintain a predetermined constant ratio of said one stream to said remaining streams.

4. In a reaction process having a plurality of reactants introduced as separate unmixed fluid streams having variable flow rates into the reaction zone of said process wherein a predetermined total flow rate of said streams is maintained by controlling the flow rate of one of said streams, the improvement comprising measuring the flow of each stream to obtain pneumatic signals proportional to the square of the individual flow rates, passing said signals to square root extraction zones to obtain linear pneumatic signals that are directly proportional to said flow rates, obtaining a resultant linear pneumatic signal that is directly proportional to the total flow rates of said streams by passing said linear signals to a totalizing zone, passing said resultant linear pneumatic signal to a flow controlling zone, and employing changes in said resultant linear signal to adjust the flow rate of said one stream so as to maintain said predetermined total flow rate.

5. In a reaction process utilizing a plurality of reactants which are introduced as separate unmixed continuously flowing fluid streams having variable flow rates into a reaction zone of said process wherein an unreacted portion of one of said reactants is recovered and returned to said reaction zone for reuse, and the total flow of said reactants introduced into said reaction zone is maintained at a predetermined value, the improvement comprising measuring the flow rate of each of said fluid streams to obtain a signal proportional to the square of the flow of each of said streams, passing said signals to square root extraction zones to obtain linear signals that are directly proportional to the flow rate of each of said streams, passing said linear signals to a totalizing zone to obtain a resultant linear signal that is directly proportional to the total flow rate of said streams, passing said resultant signal to a controlling zone and adjusting the flow rate of one of said streams in response to changes of said resultant signal to maintain the total flow rate of said streams at said predetermined value.

6. In an alkylation reaction process utilizing olefin and fresh and unreacted recycled isoparaffin as reactants, said reactants being introduced as separate, continuously flowing variable fluid streams into the reaction zone of said process, and wherein the flow rate of said olefin stream is controlled to obtain a predetermined constant ratio of its flow to the total of remaining flows, the improvement comprising measuring the flow rate of each of said isoparaffin streams to obtain a signal proportional to the square of the flow of each stream, passing said signals to a square root extraction zone to obtain linear signals directly proportional to the rate of flow of the individual isoparaffin streams, passing said linear signals to a totalizing zone to obtain an additive signal directly proportional to the total flow of said isoparaffin streams, passing said additive signal to a flow controlling zone, employing said additive signal in said flow controlling zone to adjust the flow rate of one of said isoparaffin streams in response to changes in said additive signal so as to maintain a predetermined total isoparaffin flow, measuring the flow rate of said olefin stream to obtain a signal proportional to the square of its flow, extracting the square root of said signal, comparing the signal thus obtained with said additive signal in a ratio control zone, and controlling said olefin flow so as to maintain said predetermined ratio.

7. In an alkylation reaction process utilizing olefin and fresh and unreacted recycled isoparaffin as reactants, said reactants being introduced as separate continuously flowing variable fluid streams into the reaction zone of said process, wherein the flow rate of olefin is controlled to maintain a predetermined constant ratio of olefin to the total of fresh and recycled isoparaffin flows, the improvement comprising measuring the flow rate of each of asid isoparaffin streams to obtain signals proportional to the square of the flow rates of each of said isoparaffin streams, passing said signals to square root extraction zones to obtain linear signals directly proportional to the rate of flow of the individual streams, passing said linear signals to a totalizing zone to obtain an additive signal directly proportional to the total flow of said isoparaffin streams, passing said additive signal to a controlling zone and employing said additive signal in said controlling zone to adjust the flow rate of olefin in response to changes of said additive signal so as to maintain said predetermined olefin isoparaffin ratio.

8. In an alkylation reaction process utilizing olefin and fresh and unreacted isoparaffin as reactants, said reactants being introduced as separate variable fluid streams into the reaction zone of said process, and wherein the total flow of fresh and unreacted isoparaffin introduced into said reaction zone is maintained at a predetermined value by controlling the flow of fresh isoparaffin, the improvement comprising measuring the flow rate of fresh and recycled isobutane flow streams to obtain signals proportional to the square of the flow of each stream, passing said pneumatic signals to square root extraction zones to obtain linear pneumatic signals that are directly proportional to the rate of flow of fresh and recycled isobutane, passing said linear pneumatic signals to a totalizing zone to obtain an additive pneumatic signal that is directly proportional to the total flow of said isobutane streams, passing said additive signal to a controlling zone and adjusting the flow rate of fresh isobutane passed to the reaction zone in response to changes in said additive signal so as to maintain said predetermined total flow of isobutane.

9. In combination with a fluid distribution system comprising a plurality of fluid flow streams having variable flow rates; conduit means for conveying each of said fluid streams; flow restriction means in said conduits; flow measuring means connected to obtain signals proportional to the square of fluid flow in each of said conduits; mathematical calculating means connected to obtain said signals and adapted to convert said signals into linear signals that are directly proportional to the fluid flow rates in each of said conduits; means connected to totalize said linear signals to obtain a resultant linear signal that is directly proportional to the total flow rates of said streams; control means connected to obtain said resultant linear signal; and control valve means in one of said conduits connected so as to be adjusted by said control means in response to changes in said resultant linear signal.

10. In combination with an alkylation process utilizing olefin and fresh and unused isoparaffin having variable flow rates as reactants, wherein the flow rate of said olefin stream is controlled to maintain a predetermined constant ratio of olefin to the total flow of isoparaffin, an improved fluid flow measuring and control system comprising conduit means for flowing said reactants separately as unmixed streams to a reaction zone in said process; flow responsive means positioned in said conduits to detect the rate of flow of said reactants; flow measuring means connected to obtain signals proportional to the square of fluid flow in said conduits; square root extraction means connected to convert said signals into linear signals that are directly proportional to the fluid flow rate in said conduits; signal totalizing means connected to obtain an additive linear signal that is directly proportional to the total flow in said isoparaffin-containing conduits; ratio control means actuated by said additive linear signal and by said linear signal from said olefin-containing conduit, said control means being adapted to compare the signals passed to said means and obtain a resultant ratio signal; a motor control valve in said conduit conveying olefin connected to said ratio control means, said control means being adapted to adjust the flow rate of said olefin by moving said valve means in response to changes in said ratio signal, thereby maintaining said predetermined ratio of isoparaffin to olefin.

11. In combination with a fluid flow system comprising a plurality of confined fluid flow streams having variable flow rates wherein it is desired to maintain a predetermined constant total fluid flow rate of said streams, an improved fluid flow measuring control system comprising conduit means for conveying said fluids separately as unmixed streams to a place of utilization; fluid flow responsive means in said conduits to detect the rate of flow of fluids; motor valve means in one of said conduits; flow measuring means connected across said flow responsive means in said conduits to obtain pneumatic signals proportional to the square of flow of each of said streams; square root extraction means for converting said signals into linear signals that are directly proportional to the flow rate of each stream; totalizing means connected to said square root extraction means for adding said linear signals and to obtain a resultant linear signal that is directly proportional to the total flow rate of said streams; flow control means operatively connected to said totalizing means to obtain said resultant linear signal, said flow control means being operatively connected to said motor valve means and adapted to adjust said valve in response to changes in said resultant signal so as to control the flow of fluid in said one conduit, thereby maintaining said predetermined total flow rate of said fluid streams.

12. In combination with a chemical reaction process having a plurality of reactants having variable flow rates introduced as separate unmixed fluid streams into the reaction zone of said process and wherein a predetermined total flow rate of said streams is maintained by controlling the flow rate of one of said streams, an improved fluid flow measuring and control system comprising conduit means for conveying said reactants to said reaction zone; flow responsive means in said conduits to detect the rate of flow of fluid through said conduits; motor valve means to control the rate of flow of fluid in one of said conduits; flow-type control means actuated by said flow responsive means operatively connected to said motor valve means; flow measuring means connected to said flow responsive means to obtain pneumatic signals proportional to the square of flow through said conduits; square root extraction means connected to obtain said pneumatic signals and adapted to convert said pneumatic signals into linear pneumatic signals that are directly proportional to the flow rate in each conduit; totalizing means connected to obtain said pneumatic linear signals and adapted to add said signals to obtain a resultant pneumatic linear signal proportional to the total flow rate in said conduits; control means operatively connected to said totalizing means to obtain said resultant pneumatic signal, said control means being operatively connected to said flow-type control means and adapted to adjust said motor valve in response to changes in said resultant pneumatic signal so as to maintain said predetermined total flow rate.

13. In combination with an alkylation reaction process utilizing olefin and isoparaffin as reactants having variable flow rates and wherein the reactants are introduced as separate unmixed fluid streams into a reaction zone of said process and the total isoparaffin introduced into said reaction zone is maintained at a predetermined constant total flow rate, said process having a first conduit means for unused isoparaffin, second conduit means for fresh isoparaffin, and conduit means for olefin reactant; flow responsive means to detect the rate of flow of isoparaffin in said first and second conduits; motor valve means positioned in said first and second conduits adapted to regulate the flow of isoparaffin through said first and second conduits; flow control means actuated by said flow responsive means operatively connected to said motor valve means; flow measuring means connected to said flow responsive means to obtain pneumatic signals proportional to the square of flow of said isoparaffin streams; square root extraction means connected to obtain said pneumatic signals and convert said signals into linear signals that are directly proportional to the flow rate of said isoparaffin streams; totalizing means connected to obtain said linear signals and convert said signals into a resultant linear signal proportional to the total flow of said isoparaffin streams; control means connected to obtain said resultant signal and actuate said flow control means in said second conduit so as to reset the flow rate of said isoparaffin in response to changes in said resultant signal, and thereby maintaining said predetermined flow rate of said isoparaffin streams.

References Cited in the file of this patent

UNITED STATES PATENTS

| 1,921,145 | Albright | Aug. 8, 1933 |
| 2,074,883 | Ziebolz et al. | Mar. 23, 1937 |
| 2,431,500 | Penick | Nov. 25, 1947 |
| 2,643,055 | Sorteberg | June 23, 1953 |